United States Patent
Hettmann et al.

(10) Patent No.: US 7,191,795 B2
(45) Date of Patent: Mar. 20, 2007

(54) VENTING VALVE HAVING A COVER CAP

(75) Inventors: Heinz Hettmann, Schorndorf (DE); Dieter Kremsler, Spiegelberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 141 days.

(21) Appl. No.: 10/900,181

(22) Filed: Jul. 28, 2004

(65) Prior Publication Data
US 2005/0022874 A1 Feb. 3, 2005

(30) Foreign Application Priority Data
Jul. 29, 2003 (DE) ................. 103 34 480

(51) Int. Cl.
*F16K 31/12* (2006.01)
(52) U.S. Cl. ............... 137/509; 137/454.2; 137/550
(58) Field of Classification Search ................ 137/508, 137/550, 454.2, 509, 232; 251/367
See application file for complete search history.

(56) References Cited

U.S. PATENT DOCUMENTS

| | | | |
|---|---|---|---|
| 1,498,358 A * | 6/1924 | De Krafft | 137/493.9 |
| 3,297,260 A * | 1/1967 | Barlow | 239/533.15 |
| 4,298,020 A * | 11/1981 | Inada et al. | 137/315.05 |
| 6,116,271 A * | 9/2000 | Nickel | 137/508 |
| 6,648,004 B2 * | 11/2003 | Lau | 137/223 |
| 2004/0112429 A1 * | 6/2004 | Mack | 137/115.13 |

FOREIGN PATENT DOCUMENTS

DE 100 12 893 9/2001
JP 2001-295955 A * 10/2001

OTHER PUBLICATIONS

Machine translation of the above Japanese patent.*

* cited by examiner

*Primary Examiner*—Eric Keasel
*Assistant Examiner*—Craig Price
(74) *Attorney, Agent, or Firm*—Walter Ottesen

(57) ABSTRACT

A venting valve for a fuel vessel of a portable handheld work apparatus has a valve housing which includes a base body and a valve cover. A valve plate is mounted between the base body and the valve cover. The valve plate controls a pressure compensating channel connecting the vessel interior space to the outside of the vessel. A cover cap extends over the valve cover and is fixed with an attachment shoulder on the base body. To reliably prevent a separation of the cover cap from the base body, a collar is provided on the liquid vessel wherein the attachment shoulder of the cover cap engages. The collar overlaps the free end of the attachment shoulder over a pregiven axial length (L). The inner diameter (I) of the collar is configured only slightly greater than the outer diameter (A) of the free end of the attachment shoulder.

11 Claims, 2 Drawing Sheets

VENTING VALVE HAVING A COVER CAP

CROSS REFERENCE TO RELATED APPLICATION

This application claims priority of German patent application no. 103 34 480.2, filed Jul. 29, 2003, the entire content of which is incorporated herein by reference.

BACKGROUND OF THE INVENTION

Portable handheld work apparatus with internal combustion engines include liquid vessels for operating substances such as lubricating oil or fuel. Attention has to be given especially in a fuel tank that no higher underpressure is built up in the fuel tank when taking fuel therefrom because this can disadvantageously affect the mixture formation of a membrane carburetor supplied from the fuel vessel. The membrane carburetor makes the air/fuel mixture available which is needed for the operation of the engine.

A venting valve is known from German patent publication 100 12 893. This venting valve has a valve housing made up of a base body and a valve cover. A valve member in the form of a valve plate is arranged between the base body and the valve cover. The valve plate controls a pressure compensating channel connecting the vessel interior space to the vessel exterior.

The construction is so configured that the valve housing is held together by a cover cap which engages over the valve cover and is fixed with an attachment section on the base body.

This known venting valve has been proven in practice and ensures a pressure compensation in the fuel vessel over many operating hours without the problem of fuel exiting when there is an overpressure. However, forces can act on the cover cap when there is an improper use and negligent use during work which can lead to an unwanted separation of the cover cap from the base body of the valve housing. The venting valve is then inoperable and operation with the work apparatus must be ended.

SUMMARY OF THE INVENTION

It is an object of the invention to provide a guard for the venting valve which substantially prevents a pop off of the cover cap even during improper use of the work apparatus and negligent use during operation.

The venting valve arrangement of the invention is for a vessel for holding a liquid and including a fuel tank for a work apparatus driven by an internal combustion engine. The vessel defines an interior space and the venting valve arrangement includes: a collar formed on the vessel; a valve housing; the valve housing including a base body and a valve cover; a pressure compensation channel connecting the interior space of the vessel to the ambient; a valve plate mounted in the valve housing for controlling the pressure compensation channel; a cover cap for holding the valve cover on the base body and for engaging over the valve cover; the valve cap having an attachment section defining a free end having an outer diameter (A) and the valve cap being fixed to the base body via the attachment section; the cover cap engaging into the collar so as to cause the collar to overlap the free end of the attachment section over a pregiven axial length (L); and, the collar having an inner diameter (I) which is only slightly greater than the outer diameter (A) of the free end of the attachment section.

The cover cap engages in a collar which is mounted on the fuel vessel and overlaps the free end of the attachment section over a pregiven axial length. The inner diameter of the collar is configured to be only slightly greater than the outer diameter of the free end of the attachment section so that the wall of the collar can act as a safety device of the attachment section. The forces acting on the cover cap do lead to release torques but the attachment section cannot slip off of the base body because a lateral deflection or giving way is prevented by the inner wall of the collar.

The collar is advantageously configured as one piece with the liquid vessel so that occurring mechanical forces can be conducted into the vessel wall. The free end of the attachment section preferably lies against the inner wall of the collar, for example, in the manner of a fit whereby a lateral deflection of the attachment section is reliably avoided.

The free end of the attachment section is latched onto the base body. The latch comprises an inner latch rib which engages in a latch slot of the other body. In the embodiment shown, an inner latch rib is provided on the free end of the attachment section while an outer latch slot is formed on the base body.

The pregiven axial length with which the collar engages over the attachment section is approximately so dimensioned that the collar ends at the other side of the latch. Preferably, the overlapping axial length extends approximately over the total axial elevation of the attachment section.

The collar can approximately concentrically surround the assembly opening for the venting valve in the vessel wall. A step is configured at the elevation of the vessel wall between the collar and the assembly opening. The base body of the valve preferably lies on this step with an annular shoulder. It has been shown to be practical to fix the attachment section of the cover cap to the annular shoulder of the base body.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
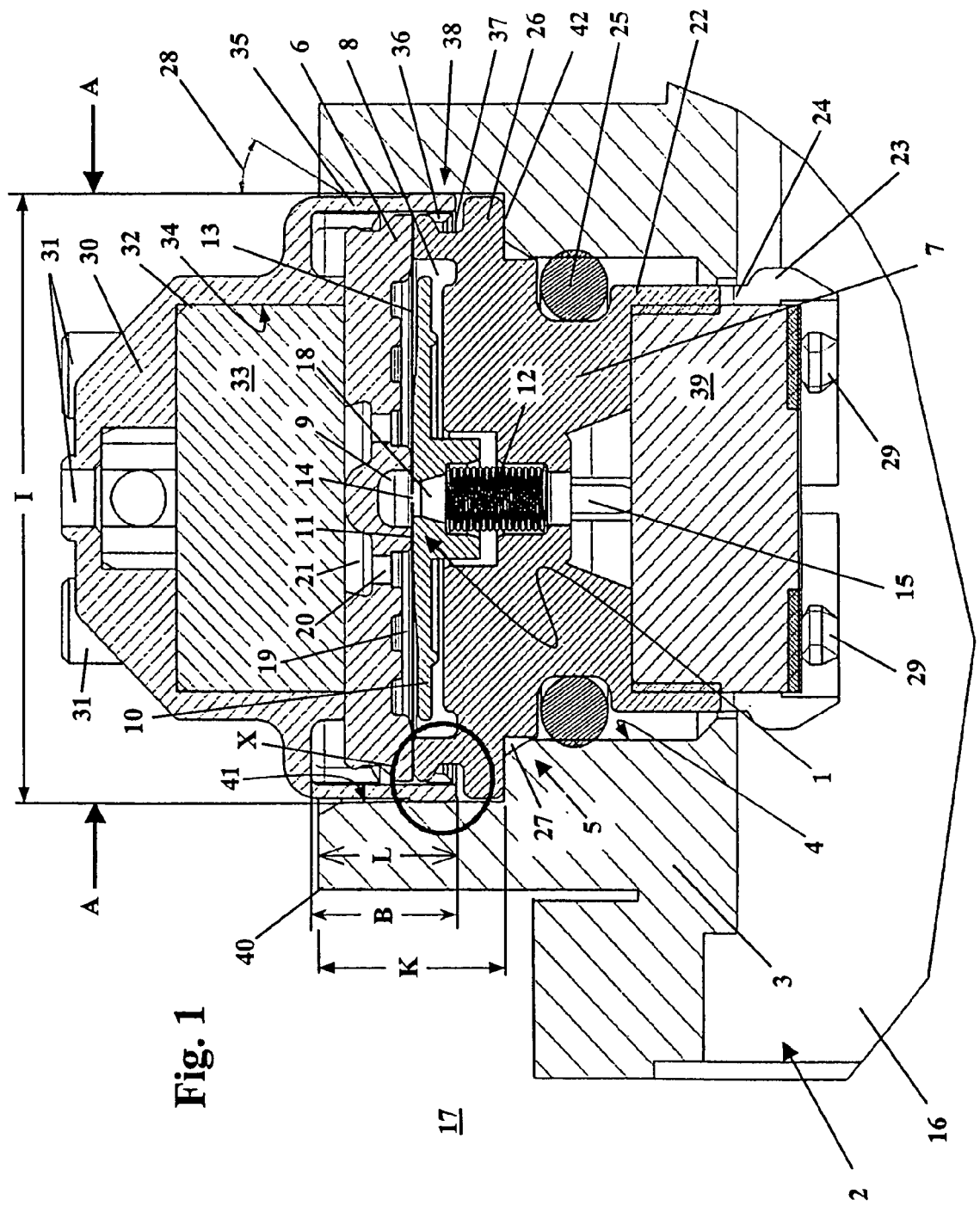
FIG. 1 is a side elevation view, in section, of a venting valve assembled in a vessel wall; and, FIG. 2 is an enlarged view of detail X of FIG. 1.

In FIG. 1, a venting valve 1 for a liquid vessel 2 is shown in section. In the embodiment shown, the liquid vessel is configured as a fuel vessel but can also be a vessel for lubricating oil, chain oil or the like. An assembly opening for the venting valve 1 is provided in the vessel wall 3 of the liquid vessel 2.

The venting valve 1 is arranged in a valve housing 5 which is made up of a valve cover 6 and a base body 7. A hollow space 8 is formed between the valve cover 6 and the base body 7 and a valve plate 10 is mounted in the hollow space 8. The valve cover 6 has a blind bore 9 preferably centered on the side facing toward the hollow space 8. The blind bore 9 is concentrically surrounded by a circularly-shaped valve seat 11. The valve plate 10 is pressed with a pregiven force by a helical spring 12 against the valve seat 11. A membrane 13 is arranged between the base body 7 and the valve cover 6 as well as between the valve plate 10 and the valve seat 11. The membrane 13 is advantageously made of plastic foil and has a center membrane opening 14 in the region of the blind bore 9. The membrane 13 lies seal tight against the valve seat 11 because of the contact pressure of the valve plate 10.

The venting valve 1 includes a pressure compensating channel 15 which connects the vessel interior space 16 to the outside 17 of the vessel. The pressure compensating channel 15 comprises a bore 18, the blind bore 9, at least an annular space 19 machined into the valve cover 6 approximately concentrically about the valve seat 11 and preferably several cover bores 20 having outside openings 21. The bore 18 is centered in the valve plate 10 and the annular space 19 is machined approximately concentrically about the valve seat 11. The cover bores 20 pass through the valve cover 6 in the region of the annular space 19. A cover cap 30 is pushed over the valve cover 6 and venting openings 31 are provided in the cover cap 30.

In the illustration shown, the pressure compensating channel 15 is blocked between the blind bore 9 and the annular space 19 by the membrane 13 lying against the valve seat 11. With an underpressure in the vessel interior space 16 relative to the outside 17 of the vessel, the elastic membrane 13 comes to lie against the valve plate 10. Such an underpressure can occur, for example, when liquid is removed from the liquid vessel 2. In this way, the pressure difference acts on the total surface of the valve plate 10 lying radially outside of the valve seat 11. Already a slight pressure difference is sufficient to overcome the pressure force of the helical spring 12 in order to lift the membrane 13 together with the valve plate 10 from the valve seat 11. In this way, the pressure compensating channel 15 is opened and air can flow into the vessel interior space 16 through the following: the valve openings 31 in the cover cap; the cover bores 20; the annular space 19; the membrane opening 14; and, the bore 18.

The base body 7 is cylindrically configured in the region of the valve plate 10 and has a connecting stub 22 which extends axially in the direction of the vessel interior space 16 and which is formed as one piece with the base body. In the assembled state, the connecting stub 22 is held in the assembly opening 4 of the vessel 2. A peripherally-extending outer latch edge 23 on the connecting stub 22 engages behind the annular wall 3 on the vessel interior side and so fixes the venting valve 1 form tight on the liquid vessel 2 in the assembly opening 4. As an assembly aid, the connecting stub 22 includes a slit 24 in the region of the latch edge 23 whereby the connecting stub 22 is elastically spring-like in the region of the latch edge 23 and can be passed through the assembly opening 4. An O-ring 25 is mounted between the connecting stub 22 and the assembly opening 4 for sealing the venting valve 1.

An air filter 33 is provided in a filter space 32 between the cover cap 30 and the valve cover 6 to protect the pressure compensating channel 15 and especially the valve seat 11 against contamination by dust particles or the like. The air filter 33 can be a paper filter or a filter made of non-woven material and is advantageously configured as a filter foam block in the embodiment shown.

The cover cap 30 is approximately cylindrically configured. The filter foam block is mounted in an inside, cylindrically-configured holding seat 34. In the outer region, the cover cap 30 includes an attachment shoulder 35 which is configured with a greater radius than the central region of the cover cap 30. In the assembled state, the attachment shoulder 35 engages over the valve cover 6 and is held form tight on the base body 7 of the valve housing 5 by an inside peripherally-arranged latch rib 36. The latch rib 36 of the cover cap 30 lies in an outer peripherally-formed latch slot 37 of the base body 7 and simultaneously fixes the valve cover 6 on the base body 7 so that the individual components of the venting valve 1 are held relative to each other. The form-tight connection of the cover cap 30 on the base body 7 can advantageously also be established by a thread, a bayonet connection or a like connection. In the embodiment shown, the connection is configured as a snap connection which latches during assembly. To simplify the assembly, the latch rib 36 is beveled and advantageously comprises several latch lugs distributed over the periphery which, conjointly, can form a peripherally-extending latch rib. Axial slits can be introduced into the periphery of the attachment section 35 in order to increase flexibility and make additional venting possible.

The cover cap 30 is advantageously injection cast as one piece of plastic, especially polyacetate or POM. A configuration which is rotationally symmetrical to its elevation axis is advantageous.

The liquid vessel 2 is provided with a collar 40 which is configured preferably as one piece with the wall 3 of the liquid vessel 2 and which surrounds the assembly opening 4 in the vessel wall 3 approximately concentrically. A step 42 is configured on the vessel wall 3 between the foot of the collar 40 and the assembly opening 4. The step 42 is provided with a bevel 27 on its inner edge toward the assembly opening 4. This serves to facilitate introduction of the connecting stub 22.

Figure 2:
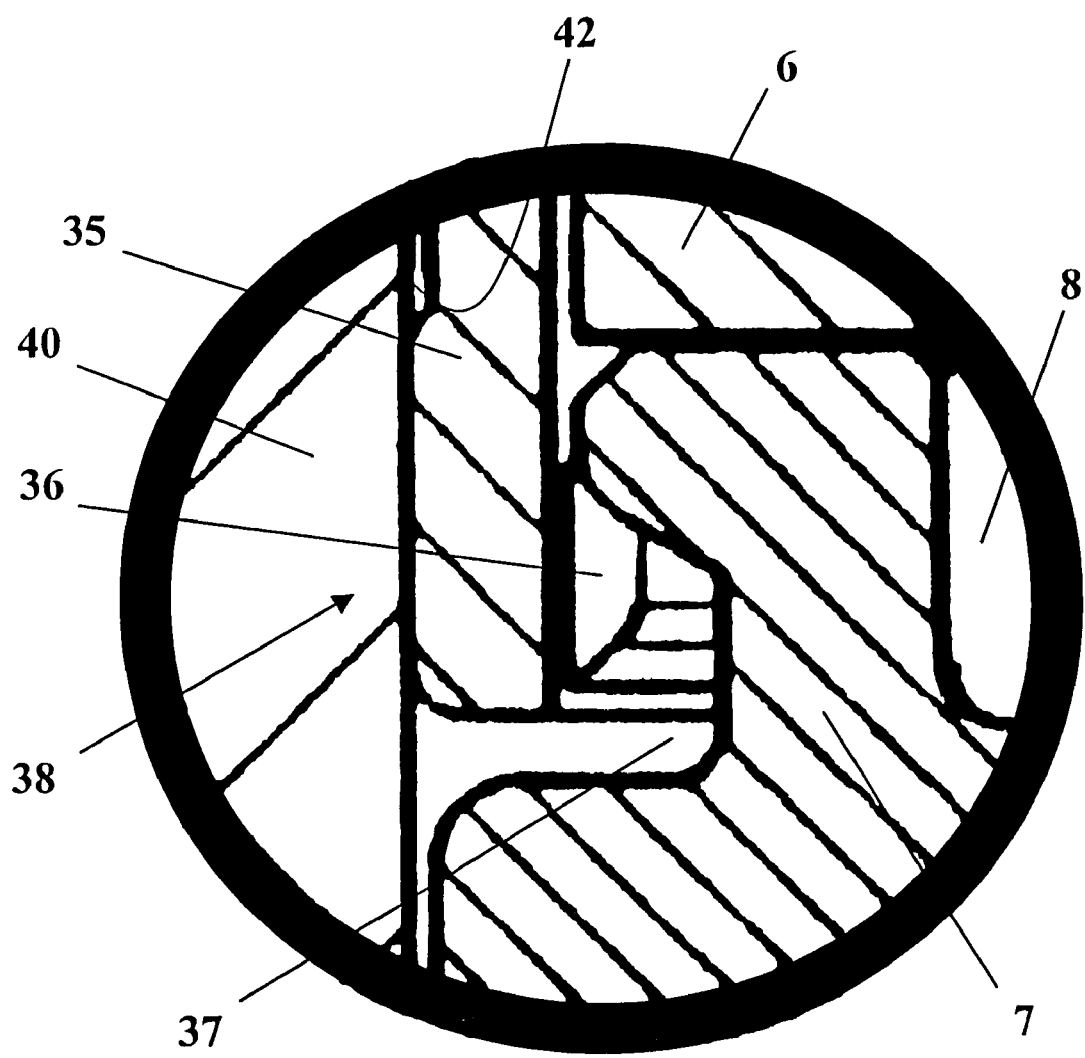

The base body 7 of the valve housing 5 lies with an annular shoulder 26 on the step 42 and determines the position of the valve housing 5 in the vessel wall 3. The attachment section 35 is connected to the base body 7 in the region of the annular shoulder 26 and, in the embodiment shown, the attachment shoulder 35 is latched. For this purpose, the latch slot 37 is provided in the outer periphery of the annular shoulder 26; whereas, the attachment section 35 has the inner latch rib 36 in the region of the free end 38. As shown in the enlarged view of FIG. 2, the latch rib 36 lies in the latch slot 37. The valve cover 6 is pressed tightly against the base body 7 by the cover cap 30. The cover cap 30, that is, the attachment section 35 thereof, in this way closes the valve housing 5 in a form-tight manner. The membrane 13 is held seal tight with its edge region between the annular shoulder 26 and the valve cover 6.

The collar 40 extends in the longitudinal direction of the valve housing 5 over an elevation K which, in the embodiment shown, is greater than the axial elevation B of the attachment section 35. As shown in FIG. 1, the collar 40 overlaps the attachment section 35 over the elevation L so that especially the latch (see detail X in FIG. 2) lies within the collar 40. As shown in the embodiment, the latching arrangement can be configured with a peripheral slot in the base body 7 and a latch rib on the attachment section 35 or the latching device can be provided in a reversed arrangement, namely, with an inner peripheral slot in the attachment section 35 and an outer latching rib or outer latching projection on the base body 7. What is essential is that the free end 38 of the attachment shoulder 35 lies within the collar 40 so that the free end 38 is surrounded by the collar 40 in the manner of an outer frame. In this way, it is ensured that even for forces, which act on the cover cap 30, an elastic deformation in the region of the free end 38 is substantially precluded so that a release of the latching device or any other attachment between the base body 7 and the free end 38 of the attachment section 35 is reliably prevented.

The inner diameter I of the collar 40 is so provided that it is slightly greater than the outer diameter A of the attachment shoulder 35. In this way, the free end 38 of the attachment shoulder 35 lies against the inner wall 41 of the collar 40 whereby the connection between the free end 38 and the base body 7 of the valve housing 5 is held in a form-tight manner. A radial deflection of the free end 38 of the attachment section 35 is prevented in a form-tight manner. Preferably, the free end 38 of the attachment section is so provided that it engages as a fit in the collar 40. In order to simplify the assembly of a fit of this kind, the inner edge at the free end of the collar is provided with a bevel 28.

If the collar 40 extends approximately over the entire elevation B of the attachment section 35, then it is sufficient that a support is provided only in the region of the free end 38 of the attachment section 35 in the region of the overlapping elevation L; whereas, in the remaining region, the outer wall of the attachment section 35 can lie with a slight distance to the inner wall 41 of the collar 40.

In an embodiment of the invention, a filter 39 is mounted in the connecting stub 22 to hold back vapors. The filter 39 shields the pressure compensation channel 15. A sinter plastic or like material can be used as a filter 39 holding back fuel vapors. A filter 39 of this kind is inserted with an accurate fit as a form-stable body into the connecting stub 22 and is secured in its position in the connecting stub 22 by latch lugs 29.

It is understood that the foregoing description is that of the preferred embodiments of the invention and that various changes and modifications may be made thereto without departing from the spirit and scope of the invention as defined in the appended claims.

What is claimed is:

1. A venting valve arrangement for a vessel for holding a liquid and including a fuel tank for a work apparatus driven by an internal combustion engine, the vessel defining an interior space and the venting valve arrangement comprising:
   a collar formed on said vessel;
   a valve housing;
   said valve housing including a base body and a valve cover;
   a pressure compensation channel connecting said interior space of said vessel to the ambient;
   a valve plate mounted in said valve housing for controlling said pressure compensation channel;
   a valve cover cap for holding said valve cover on said base body and for engaging over said valve cover;
   said valve cover cap having an attachment shoulder defining a free end having an outer diameter (A) and said valve cover cap being fixed to said base body via said attachment shoulder;
   said attachment shoulder having an inner side whereat said attachment shoulder is held form-tight on said base body of said valve housing;
   said attachment shoulder having a free end engaging into said collar so as to cause said collar to overlap said free end of said attachment shoulder over a pregiven axial length (L); and,
   said collar having an inner diameter (I) which is only slightly greater than said outer diameter (A) of said free end of said attachment shoulder so that a loosening or separation of the attachment between said base body and said free end of said attachment shoulder is reliably prevented.

2. The venting valve arrangement of claim 1, wherein said collar is as an integral part of said vessel.

3. The venting valve arrangement of claim 2, wherein said free end of said attachment shoulder lies in contact engagement with the inner wall of said collar.

4. The venting valve arrangement of claim 3, wherein said free end of said attachment shoulder engages in the manner of a fit into said collar.

5. The venting valve arrangement of claim 3, said free end of said attachment shoulder and said base body conjointly defining an interface; and, said arrangement further comprising latching means at said interface for latching said free end to said base body.

6. The venting valve arrangement of claim 1, wherein the wall of said vessel has an assembly opening formed therein and said collar surrounds said assembly opening approximately concentrically.

7. The venting valve arrangement of claim 6, wherein said wall of said vessel has a step formed thereon between said collar and said assembly opening; and, said valve body has an annular shoulder formed thereon and said valve body is seated on said step with said annular shoulder.

8. The venting valve arrangement of claim 7, wherein said attachment shoulder is fixed on said annular shoulder of said valve body.

9. A venting valve arrangement for a vessel for holding a liquid and including a fuel tank for a work apparatus driven by an internal combustion engine, the vessel defining an interior space and the venting valve arrangement comprising:
   a collar formed on said vessel;
   a valve housing;
   said valve housing including a base body and a valve cover;
   a pressure compensation channel connecting said interior space of said vessel to the ambient;
   a valve elate mounted in said valve housing for controlling said pressure compensation channel;
   a valve cover cap for holding said valve cover on said base body and for engaging over said valve cover;
   said valve cover cap having an attachment shoulder defining a free end having an outer diameter (A) and said valve cover cap being fixed to said base body via said attachment shoulder;
   said attachment shoulder having an inner side whereat said attachment shoulder is held form-tight on said base body of said valve housing;
   said attachment shoulder having a free end engaging into said collar so as to cause said collar to overlap said free end of said attachment shoulder over a pregiven axial length (L);
   said collar having an inner diameter (I) which is only slightly greater than said outer diameter (A) of said free end of said attachment shoulder so that a loosening or separation of the attachment between said base body and said free end of said attachment shoulder is reliably prevented;
   wherein said collar is as an integral part of said vessel;
   wherein said free end of said attachment shoulder lies in contact engagement with the inner wall of said collar;
   said free end of said attachment shoulder and said base body conjointly defining an interface; and, said arrangement further comprising latching means at said interface for latching said free end to said base body; and, said latching means including a latch slot formed in said base body and a latch rib arranged on said free end of said attachment shoulder for engaging in said latch slot.

10. The venting valve arrangement of claim 9, wherein said axial length (L) extends approximately over the axial length of said latching means.

11. The venting valve arrangement of claim 10, wherein said attachment shoulder has an axial length (B); and, said axial length (L) extends approximately over all of said axial length (B) of said attachment shoulder.

* * * * *

UNITED STATES PATENT AND TRADEMARK OFFICE
CERTIFICATE OF CORRECTION

PATENT NO. : 7,191,795 B2
APPLICATION NO. : 10/900181
DATED : March 20, 2007
INVENTOR(S) : Heinz Hettmann and Dieter Kremsler It is certified that error appears in the above-identified patent and that said Letters Patent is hereby corrected as shown below:

In column 6:
Line 37 : delete "elate" and substitute -- plate -- therefor.

Signed and Sealed this

Twelfth Day of June, 2007

JON W. DUDAS
*Director of the United States Patent and Trademark Office*